United States Patent [19]

Jöst

[11] Patent Number: 4,495,424
[45] Date of Patent: Jan. 22, 1985

[54] PLANT FOR UTILIZATION OF WIND AND WAVES

[76] Inventor: Bernhard Jöst, Traminerweg 4, D-8600 Mannheim 31, Fed. Rep. of Germany

[21] Appl. No.: 456,005

[22] PCT Filed: Apr. 15, 1982

[86] PCT No.: PCT/DE82/00086
§ 371 Date: Jan. 7, 1983
§ 102(e) Date: Jan. 7, 1983

[87] PCT Pub. No.: WO82/03662
PCT Pub. Date: Oct. 28, 1982

[30] Foreign Application Priority Data

Apr. 16, 1981 [DE] Fed. Rep. of Germany ....... 3145419

[51] Int. Cl.$^3$ ............ F03B 13/12; F04B 17/02
[52] U.S. Cl. .................... 290/53; 290/54; 290/55; 417/332; 60/499; 60/506
[58] Field of Search .................. 290/42–44, 290/53–55; 417/100, 333–334, 336, 337; 60/497, 499, 501, 506

[56] References Cited

U.S. PATENT DOCUMENTS

| | | | |
|---|---|---|---|
| 387,102 | 7/1888 | Nagel | 416/41 |
| 641,233 | 1/1900 | Röell | 417/330 |
| 835,667 | 11/1906 | Donnelly | 416/143 |
| 937,712 | 10/1909 | McFarland, Jr. | 60/501 |
| 1,045,654 | 11/1912 | Willy | 417/330 |
| 1,073,682 | 9/1913 | Henderson | 417/330 |
| 1,544,031 | 6/1925 | Polleys | 60/506 |
| 1,654,165 | 12/1927 | Felt | 290/55 |
| 4,159,427 | 6/1979 | Wiedemann | 290/55 |
| 4,204,126 | 5/1980 | Diggs | 290/55 |
| 4,206,608 | 6/1980 | Bell | 290/55 |
| 4,265,085 | 5/1981 | Bahrenburg | 290/44 |
| 4,316,704 | 2/1982 | Heidt | 60/501 |
| 4,317,047 | 2/1982 | de Almada | 290/53 |

FOREIGN PATENT DOCUMENTS 274386  5/1930  Italy .................... 60/497

*Primary Examiner*—B. Dobeck
*Assistant Examiner*—Shelley Wade
*Attorney, Agent, or Firm*—Collard, Roe & Galgano

[57] ABSTRACT

A plant for the combined utilization of energy from both wind and waves includes a plurality of fluid flow engines for utilizing both energies, and generating power therefrom. Each engine includes blades for making use of the energy of the wind, and a float for making use of the energy of the waves. The engines operate a common turbogenerator, and a floating carrier receives the turbogenerator. A low-loss power transmission is provided for transmitting power generated by the engines to the turbogenerator; it includes a pressure vessel adapted to store water under pressure to drive the turbogenerator, a conduit to pass the water under pressure to the vessel, and a pump driven by the engines to draw in the water from a water source, and to deliver it through the conduit to the vessel.

9 Claims, 20 Drawing Figures

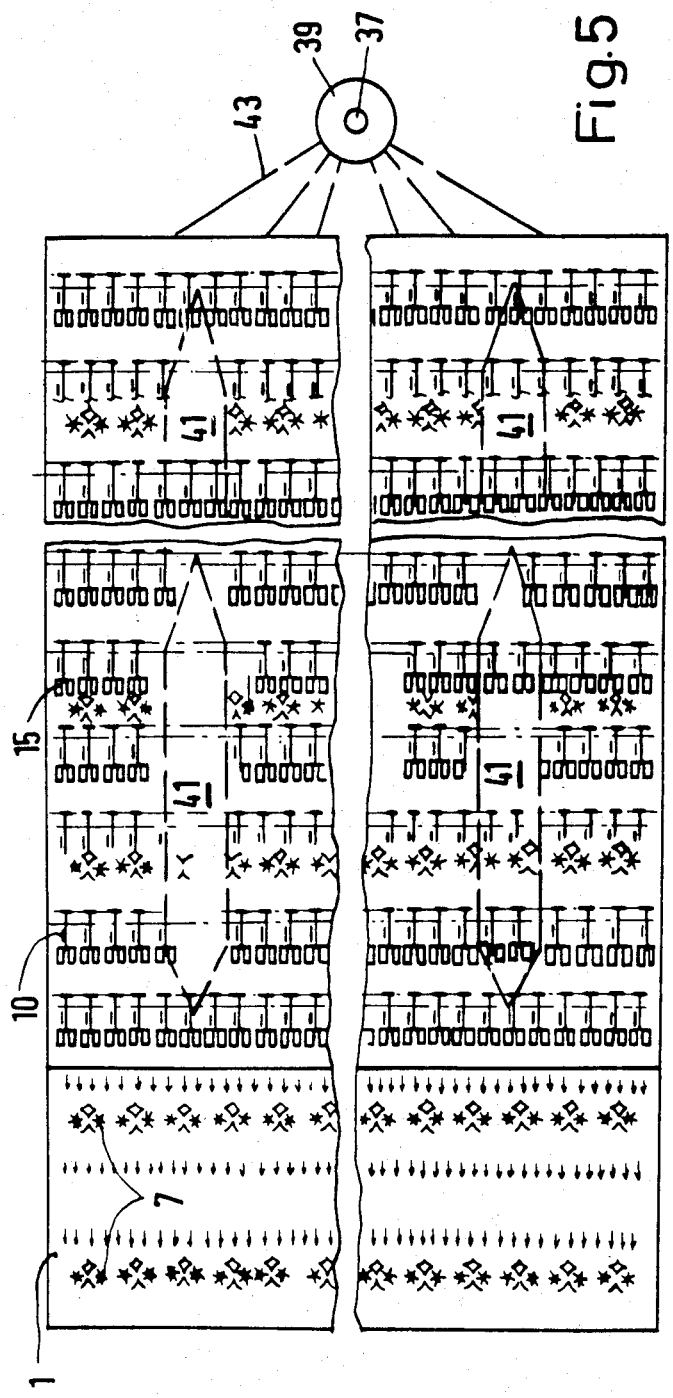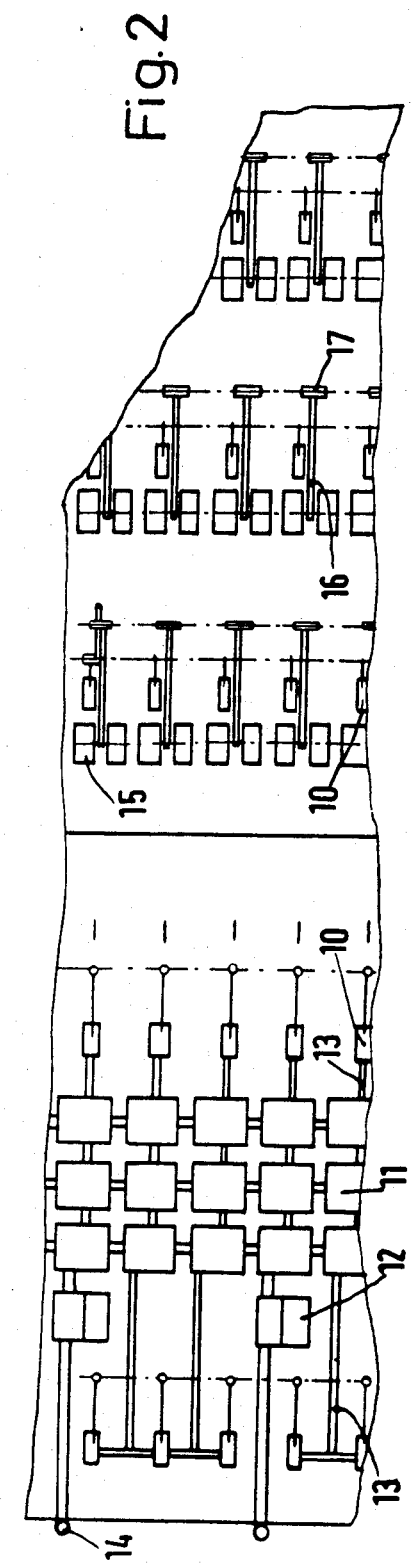

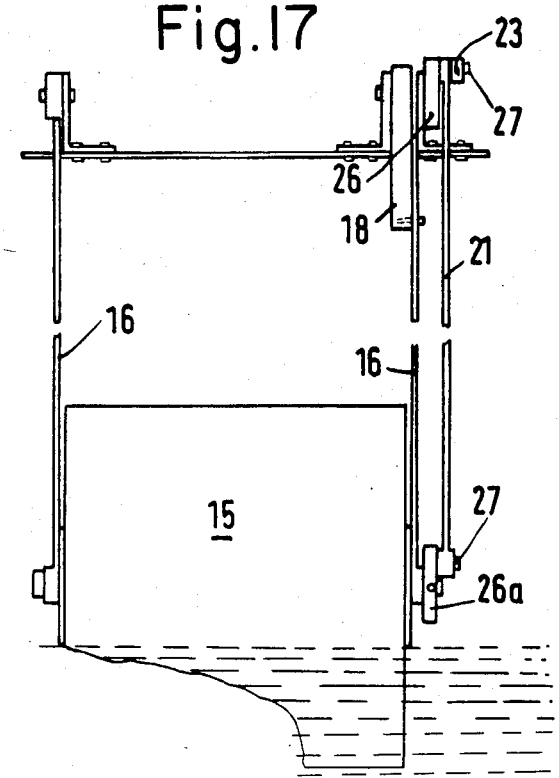
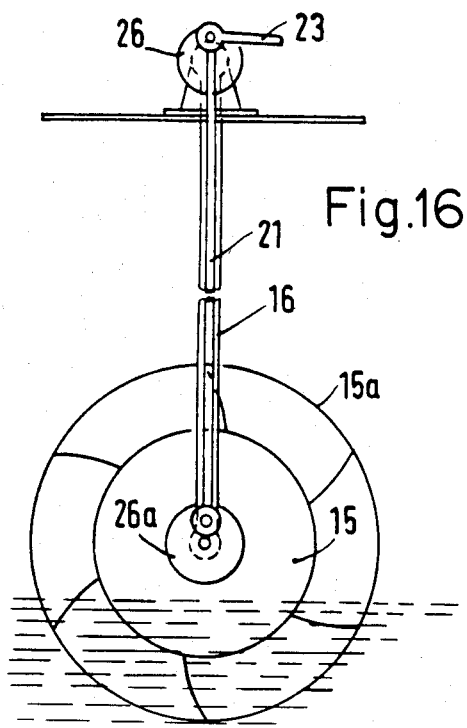

PLANT FOR UTILIZATION OF WIND AND WAVES

FIELD OF THE INVENTION

The invention relates to a combined wind- and wave-utilization plant, which combines the utilization of both the energy of the wind, as well as the energy of the waves of the sea, or of large lakes.

BACKGROUND OF THE INVENTION

The combined wind- and wave-utilization plant includes fluid flow machines for utilization of both flow energies, which in general, must always be disposed in the direction of the wind. It is therefore advisable to install the fluid flow engines jointly on a floating carrier, which, being rotatably anchored, is automatically set into the wind.

Based on the state of the art, until today, cost-effective large plants for utilization of the wind- or wave-energy have not yet become known. Causes for the absence of any cost-effective large plants for the utilization of wind- and wave-energy are the fluctuating forces of the wind. Even on the windy north sea coast a large plant can provide full output only during about ninety days of the year. The plant is non-operating for the same time, as the minimal wind strength 6 for operating the plant is absent. As the generator output increases with an increasing number of revolutions, slow rotors, like windmills and American wind wheels, are no longer cost-effective for generation of larger currents. Rapidly rotating propellers, however, require larger wind strengths.

But several experiments have hitherto been undertaken, also for the utilization of waves, where particularly floats suspended from a pendulum suspension have been utilized.

SUMMARY OF THE INVENTION

It is an object of the present invention to create a combined wind- and wave-utilization plant, in which both aforesaid energy types can be utilized in an optimal manner, and be transformed into electrical energy.

The combined wind- and wave-utilization plant consists, according to the invention, by the fluid flow engines for utilization of both flow energies being equipped with novel blades, and being provided with floats as well as a low-loss transmission by means of pumps, pressure conduits, and pressure vessels, which operate common turbo-generators, installed on floating carriers.

In the plant, according to the invention, slow rotors can therefore be utilized as wind wheels, which operate already at a wind strength of one, without there being utilized any uneconomically large conversions of a different type for the generation of current. Furthermore, there act on the same pumps, with their pressure conduits and pressure vessels, which operate common turbo-generators, novel floats with shovels, and wherein the pumps and water conduits transmit the force of the waves up to the engine locations through pressure vessels to turbo-generators in the interior of the ship, so that in an external region of the plant, according to the invention, no sensitive machines or electrical conduits are required. The external water conduits and pumps are water insensitive, and can withstand any flooding. Here all waves between 0.5 and 10 meters can be fully utilized. During smaller waves, the double-acting piston pumps act like blade pumps, whose balance lever is set in to-and-fro-motion for only a short time. During large waves, the piston operates during its full cylinder length, possibly with several strokes per wave.

The following additional advantages result by the wind wheels acting on the pumps.

1. An arbitrary number of smaller wind wheels can operate a current generator.
2. Even the smallest output of the wind wheels is not thrown away, as in other systems, but is fully utilized.
3. The generator does not need any complicated control devices for a constant frequency in the case of any wind fluctuations, as the pressure vessel provides this free of cost.
4. In this manner, the highest pressures may be generated, which drive the largest and most efficient turbo-generators, which cannot be stationed on any propeller tower.
5. Slower wind wheels have much less wear and tear on the wing points than those of 300 km/hr, and have the same output at the same operating surface and the same wind strength, namely, one wheel of 10 m diameter has an output at a wind strength $5=2.38$ kW, and four wheels of a diameter of 5 m have an output of $4\times 0.59\ kW=2.36\ kW$. But as the small rotor, contrary to the rapid rotor, provides an output even at the lowest wind strengths, it is, as an average, much more productive per year.
6. Generators positioned on the ground may be dimensioned to be ten times as large as those positioned on tips of towers.
7. The increased expense for pumps and vessels are made up by control devices which are no longer required.
8. If an approximately 100 m propeller is damaged, which has occurred hitherto at the latest within three years, then the entire plant must be taken out of operation for a long time. In the case of small rotors with small blades, this is a matter of a few hours without any interruption of the operation. Since a protective screen for 100 slow rotors of 10 m diameter does not cost more than a tower for one 100 m blade with a generator, the plant, according to the invention, is more economical.

The plant, according to the invention, can be manufactured in a modular system, for example, in shipyards, and can be towed to the destination. In a connecting network from the northernmost point of Norway to South Africa, connected by sea cables, even geographically conditioned wind-stillnesses can be overcome. The plant, according to the invention, may, of course, be utilized for all other coasts. Further applications are possible as:

1. Largely self-contained anchor points on the seas for shiplines and airlines,
2. Wave-breakers ahead of endangered islands, such as, for example, Helgoland,
3. Factories for processing of fish in remote fishing grounds,
4. Factories for the manufacture of hydrogen, etc.,
5. Research bases in all seas,
6. Factories for all stream- or water-intensive processes, for example, manufacture of aluminum, etc.,
7. Factories for dangerous and malodorous materials,
8. Absolutely wave-free docking facilities for ships of all kinds, 9. Hydrogen tank locations with their own hydrogen manufacture for airplanes and ships having hydrogen drives,
10. Beacons and fog-horn warning stations, etc.,
11. Sea-water desalting plants and land watering, etc.

BRIEF DESCRIPTION OF THE DRAWINGS

Other objects and features of the present invention will become apparent from the following detailed description considered in connection with the accompanying drawings, which disclose several embodiments of the invention. It is to be understood that the drawings are to be used for the purposes of illustration only, and not as a definition of the limits of the invention.

In the drawings, wherein similar reference characters denote similar elements throughout the several views:

FIG. 2 is a partial view of the machine rooms and the outer bridge from above.

FIG. 5 is a view of the implementation form of FIG. 3 from above.

FIG. 16 is an elevation view of a pendulum swinger with an outer-lying crank rod.

FIG. 17 is a side view of FIG. 16.

DESCRIPTION OF THE PREFERRED EMBODIMENTS

Figure 1:
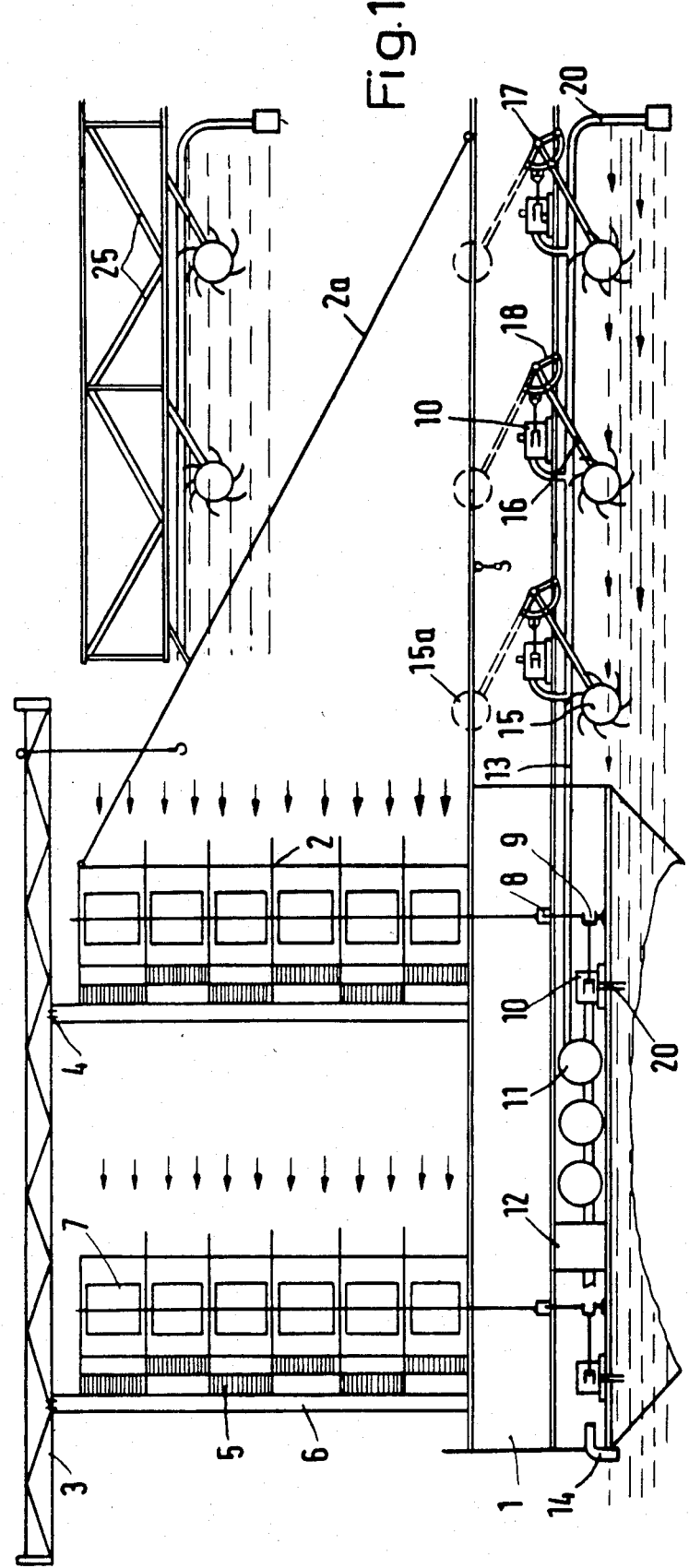
FIG. 1 is partial view of a combined wind- and wave-utilization plant, transverse to the wind direction.

From FIG. 1 there is obtained the wind- and wave-utilization plant, which consists of a main ship 1, having about the size of a tanker of about 250,000 tons, a length of about 350 m, and a width of about 50 m, with machine rooms for pumps, pressure vessels, turbo-generators, and accessories.

On the upper deck 2, there are disposed steel scaffoldings permitting passage of the wind, and extending over the entire length of the ship at an arbitrary height of from about 40 m. upwards for receiving the wind wheels 7. For transporting spare parts and the like, there are provided movable cranes or tower cranes 3 and 3a, respectively, rollers 4 for a crane, steel steps 5 or ladders 6, as well as elevators for any high scaffolding. The supports 8 serve to receive the vertical axles of the wind wheels in all corner passages. The crank shaft 9 serves for the direct drive of the pumps free of any bevel gears, and a gearing may be provided for regulating the number of strokes. In the lower part there are provided pumps 10, pressure vessels 11, and a turbo-generator 12, as well as pressure conduits 13 from the pumps to the tanks, as well as a turbine discharge 14. The floats 15 are coupled to the individual pumps, and are lined with a water-resistant synthetic material, so that they are unsinkable even during leakage. Float 15a is shown positioned at high wave formation; the floats are secured to pendulum rods 16, which are supported in bearings 17, and include a toothed segment 18 for drive of the toothed gear with crank pins for the pump drive 19, (FIG. 3), as well as suction conduits 20 for the pump.

Wave breakers are affixed to the plant at a certain height to secure it against any undesired wave height, for example, a wave height above 10 m, which wave breakers pass normal waves unhindered.

In FIG. 2 there is seen a view of the plant from above, the pumps 10, the tanks 11, the turbo generators 12, the pressure conduit 13, the turbine discharge 14, the floats 15, the pendulum rods 16, and the supports 17 for the pendulums, being visible in their row. In the open working zones there are only disposed pumps and water conduits, which can be flooded with water without being damaged.

Figure 3:
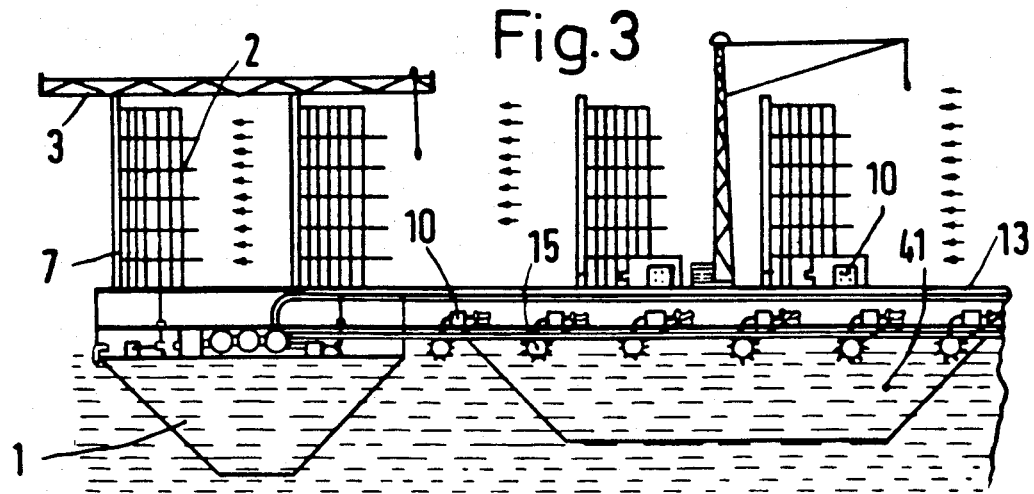
FIG. 3 is a larger partial view with many floating pump aggregates and constructions of wind wheels.

From FIG. 3, which is a larger partial view of the plant, there are visible at the end of the plant the transversely positioned main ship 1, with machine rooms and structures, the steel structures 2 for the wind wheels, and the bridge- or tower-rotating cranes 3, 3a, as well as the wind blades 7, the pumps 10, the pressure conduits 13 for the pressure vessels, the pendulum floats 15, the suction conduit 20, and there are also provided as small as possible carrier ships 41 for the bridge structures.

Figure 4:
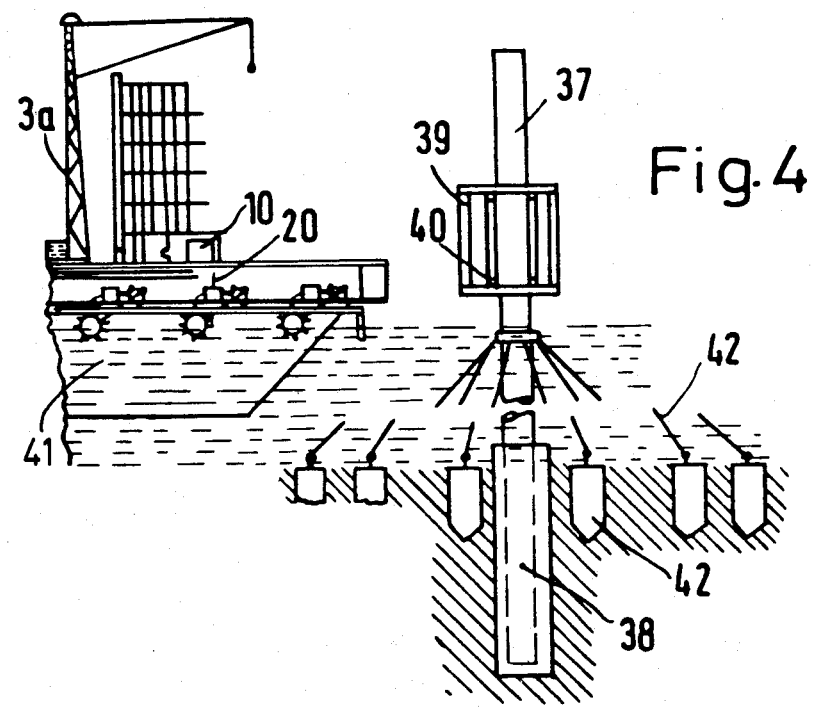
FIG. 4 is an anchor mast for the floating plant.

The anchor mast 37, 38, made of a steel concrete tube, shown in FIG. 4, can be poured out locally from concrete. The part above the water is round and smooth, so that the annular basket 39 may be easily rotated on its rolls and pins 40, and may be moved upwards and downwards. The annular basket is filled with a water-resistant synthetic material, so that it always floats on the surface of the water. It carries the holding ropes of the plant, so that these position themselves automatically in the wind. The anchor mast is held by chains, ropes or iron rods 42, anchored to the sea floor.

FIG. 5, which represents a view of the plant of FIG. 3 from above, shows the wind blades 7, the pumps 10, the floats 15, and the small carrier ships 41, spaced as far as possible from one another, which do not hinder the waves much.

Figure 6:
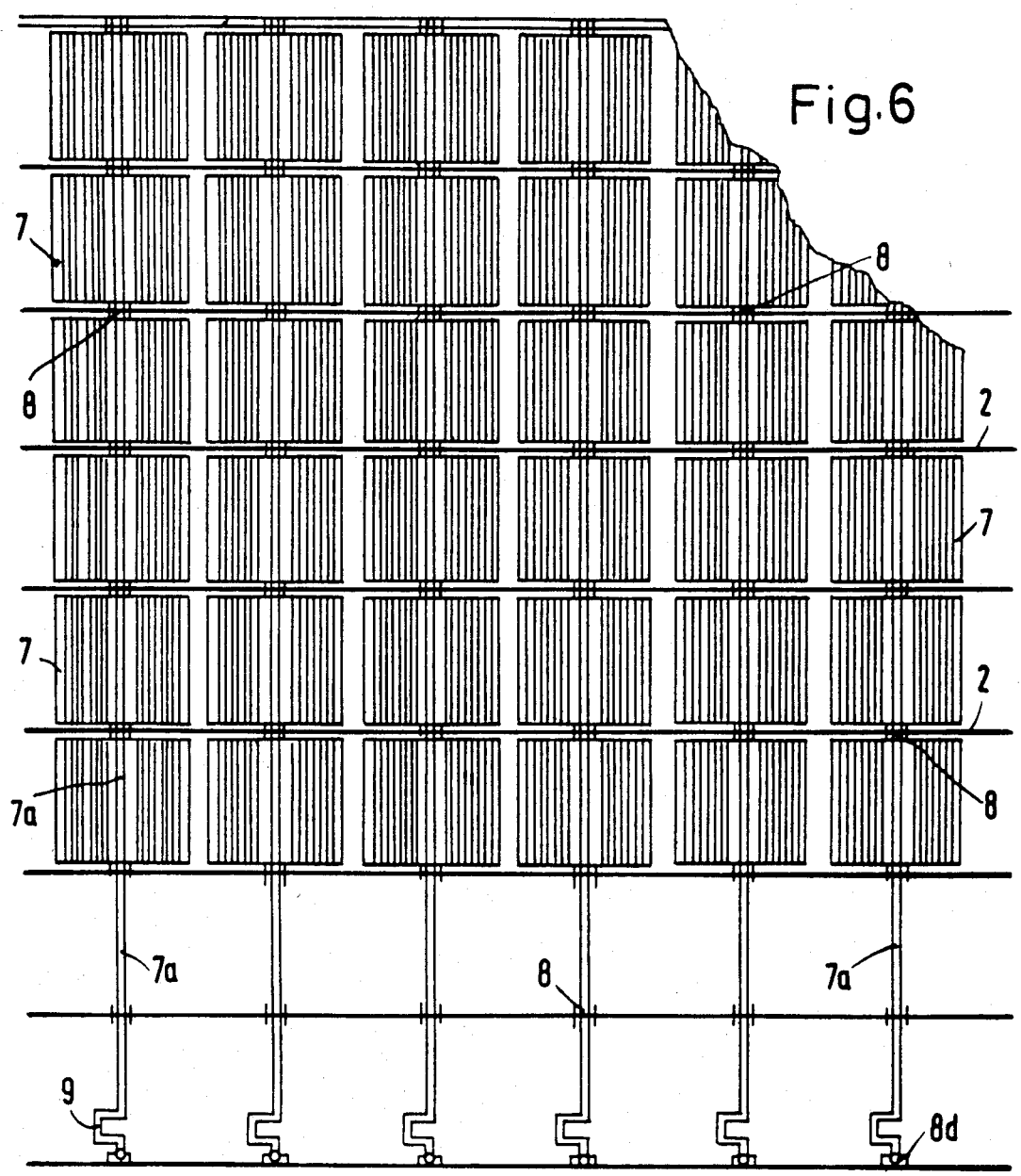
FIG. 6 is a cut-away portion in broadside of a scaffolding with wind wings.

The scaffolding 2 shown in FIG. 6 receives the wind blades 7 with the vertical tube axles 7, 8 reinforced downwardly, there being provided supports 8 on each deck through-passage, as well as foot supports 8d. The crank shaft 9 serves for driving the pumps.

Figure 7:
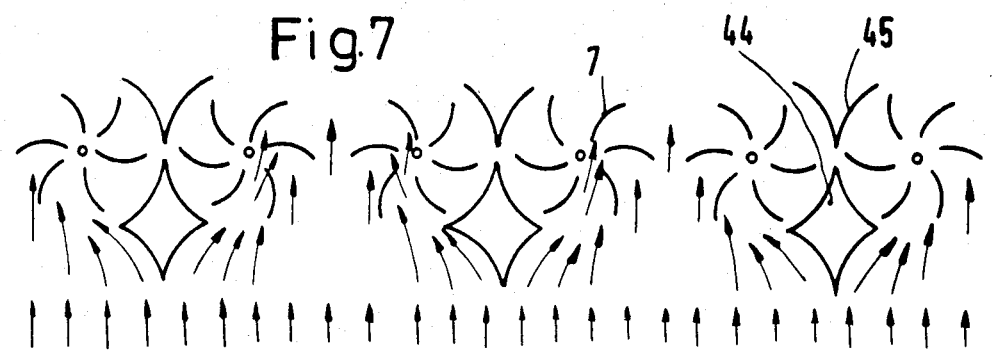
FIG. 7 is a view a wind wing of FIG. 6 from above.

In FIG. 7 there are illustrated the wind blades according to FIG. 6, seen from above, where there are provided wind-guidance surfaces not illustrated in the other figures. The wind blades 7 include gaps between the axle and the wing for wind passage, so as to activate the rear wings. Star-like wind guidance walls are denoted by 44, which are to hold off the wind from oppositely disposed blades, and to guide it in a favorable direction to the operating side of the wind blades. The rear guidance walls 45 prevent mutually interfering air streams of the two oppositely running wind wheels of each group.

Figure 8:
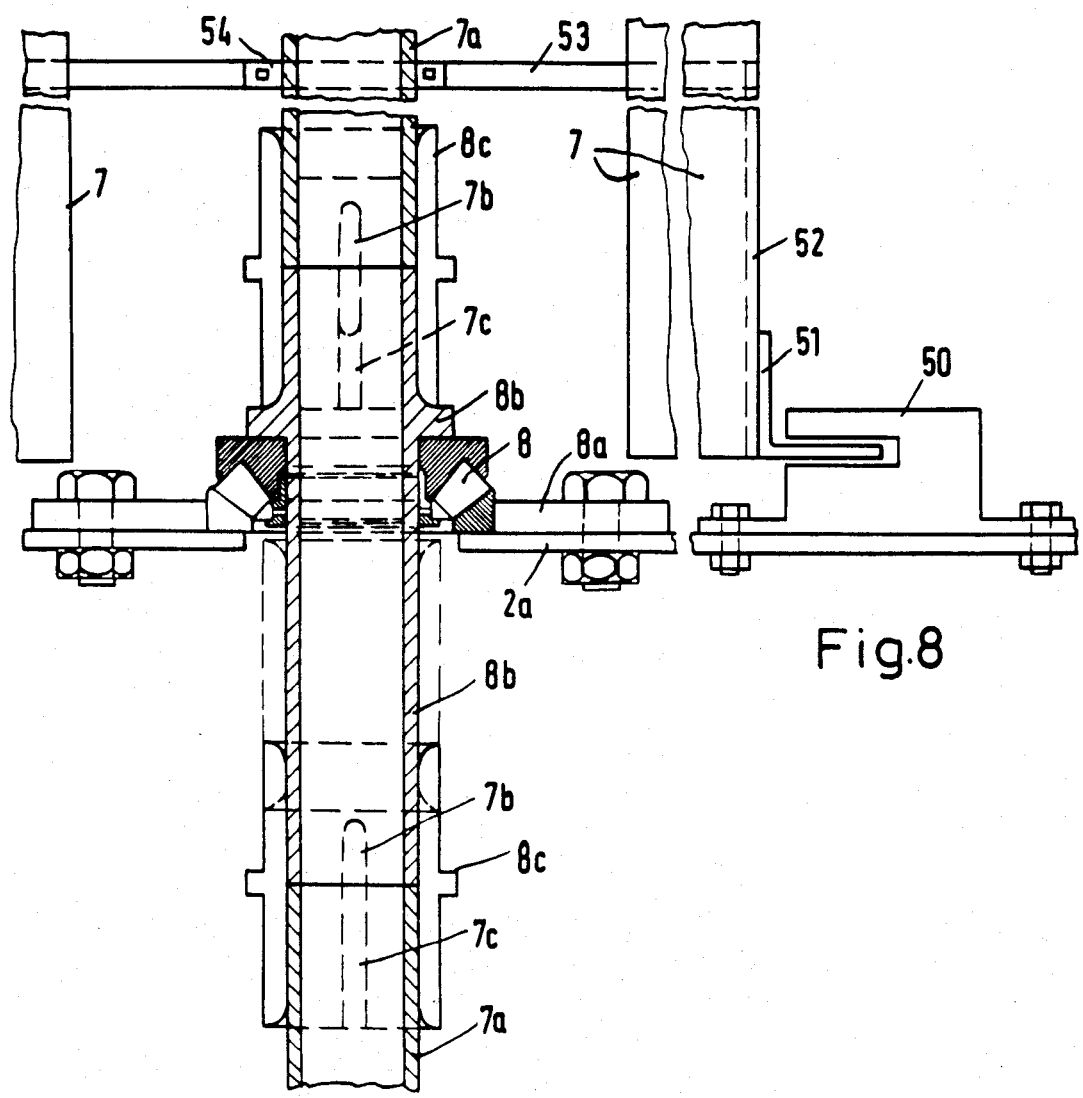
FIG. 8 is an elevation view of a special connection for the individual tube axles between the floors of the scaffolding.

The special connection shown in FIG. 8 for the individual tube axles between the floors of the scaffolding permits a rapid installation and completion of the axles and blades in each floor, without the need to cease operation of the blades therebelow or thereabove. By the easily affixable engagement and disengagement arrangement, both sleeves 8c, namely the upper and the lower sleeves, are pressed simultaneously upwardly, and the axle with the blades of one floor is decoupled and free for further use. The bottom of a floor is denoted with 2a. On the tube axle 7a there is provided a recess 7b, with a wedge disposed with one half each in the axle of the tube, and in the connecting sleeve 8b. The recess 7c in the sleeve 8c is open at the lower end of the sleeve for insertion over the wedge, and is closed at the upper end of the wedge, so that the sleeve can be secured exactly in the center between the end of the casing and the end of the axle. The bearing 8 with the holding ring 8a, the connecting sleeve 8b, and the slidable sleeve 8c lies on the bottom 2a of a floor. A typical magnetic brake 50 can be actuated singly, in groups, or all brakes together by a remote control, and wherein a brake ring 51 is secured to the reinforcing ribs 52. The carrier rails 53 hold the wings, and the tube collars 54 serve for affixing the carrier rails.

Figure 9:
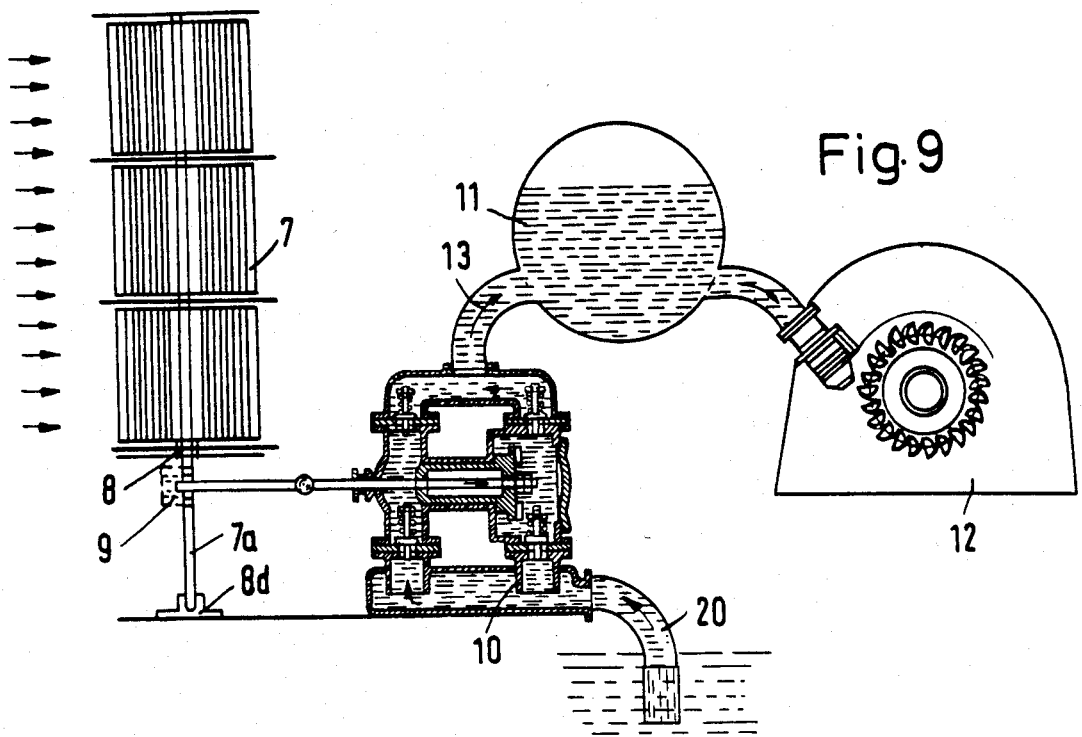
FIG. 9 is a schematic representation in elevation of the wind drive by means of wind wheels, pumps, pressure vessels and turbo generators.

FIG. 9 shows the schematic representation of the wind drive by means of wind wheels, pumps, pressure vessels and turbo-generators. The wind blades 7 driven by the wind operate, by means of their vertical axle 7a, the pump 10 through the crank shaft 9, which vertical axle 7a, according to the stress it is subjected to, is correspondingly reinforced towards the bottom, and is supported in intermediate supports 8, and in a foot support 8d. The pump 10 sucks water through a suction conduit 20, and presses it through a pressure conduit 13 into the pressure vessel 11, which communicates with the turbo-generator 12.

Figure 10:
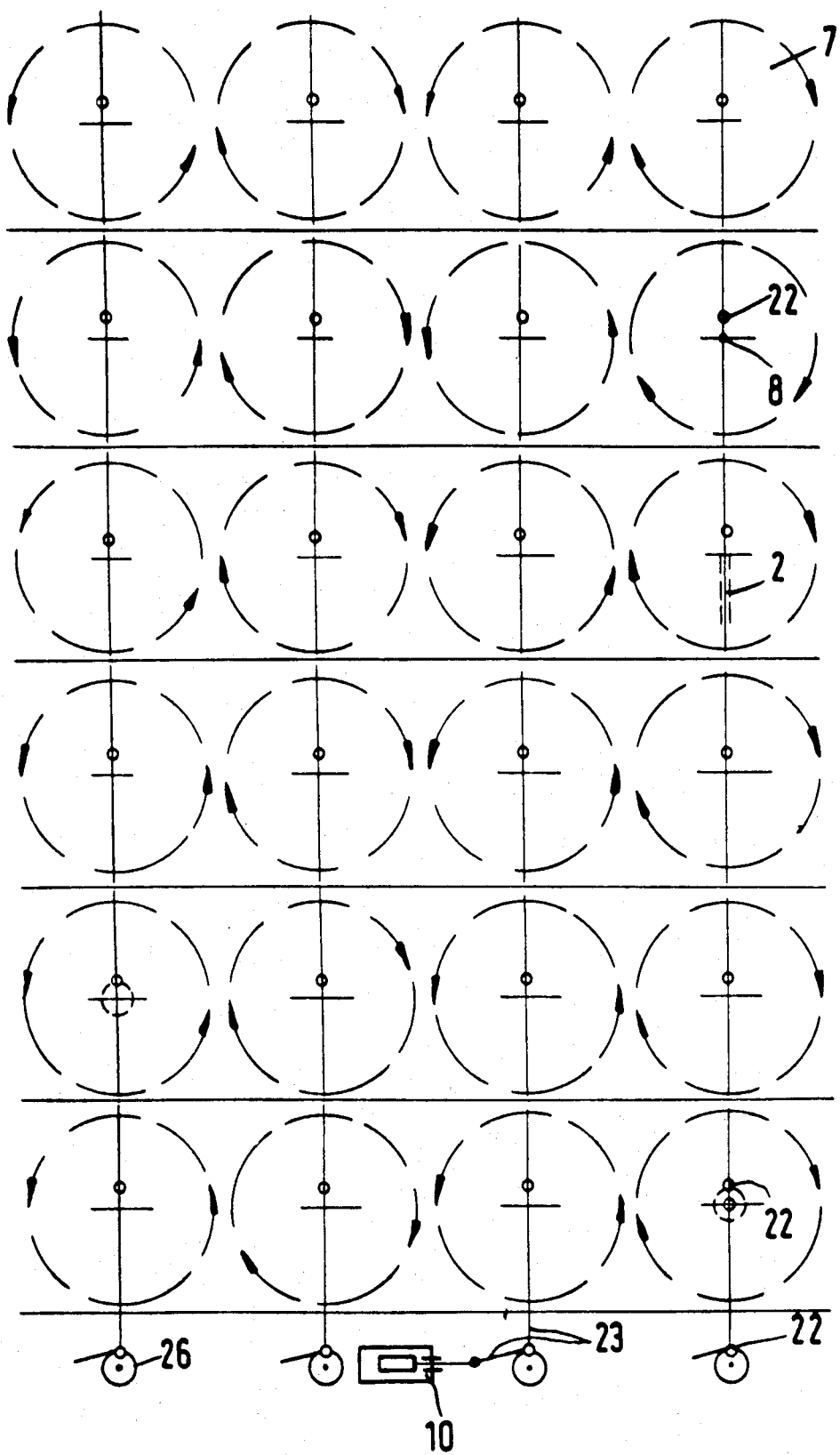
FIG. 10 is a cut-away portion in elevation of a front with horizontally supported novel wind drives.

FIG. 10 shows a cut-away portion of the front region of the horizontally supported, novel wind drive, where the blades 7 are so adjusted, that each neighboring wheel rotates in an opposite direction, so that the air streams at the contact points flow in the same direction and are not oppositely braking one another. The wind blades are so formed, that the wind is always deflected from the center of the wind blades to the effective tips, and therefore causes the greatest torque. The advantages of this system consist in great air stream penetrability, in the highest output, and in the avoidance of the wind guidance surfaces. Any wind blades 7 are disposed in a wind-penetrable iron scaffolding 2 in bearings 8, and are connected to the pumps 10 through crank shafts 22, and crank rods 23.

Figure 11:
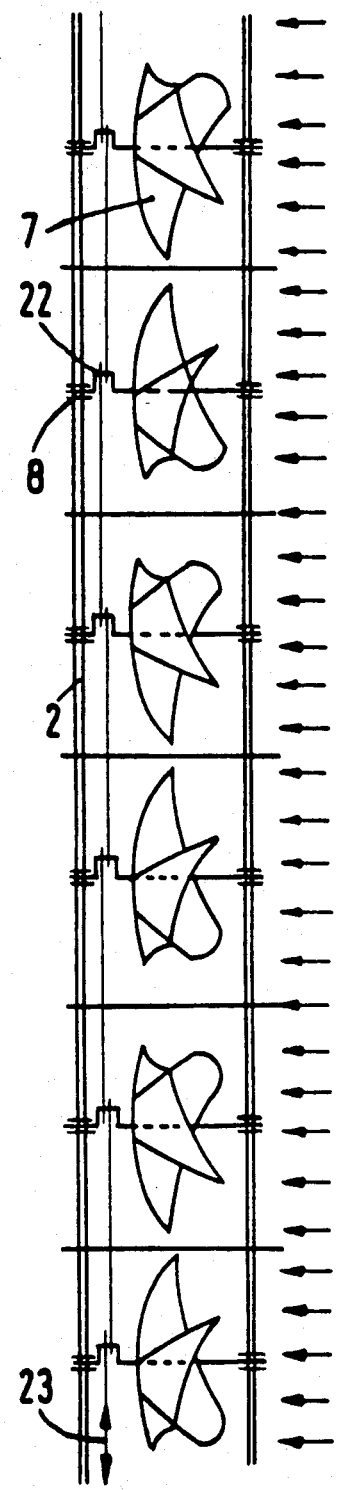
FIG. 11 is a side view of FIG. 10.

The arrangement shown in FIG. 10 is shown in side view in FIG. 11, the iron scaffolding 2, the wind blades 7, the bearings 8, the crank shafts 22, and the crank rods 22 being visible.

Figure 12:
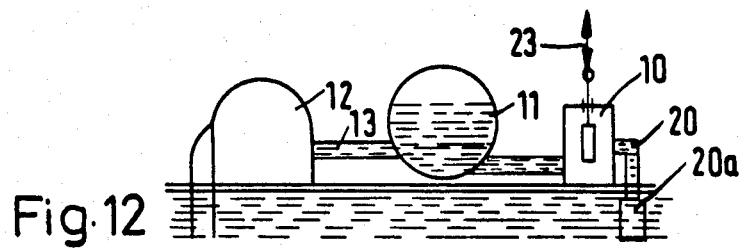
FIG. 12 is a schematic representation in elevation of the operation when utilizing the blades of FIG. 11.

The operation shown in FIG. 12 provides for vertical pumps 10 during utilization of the blades 7, where the drive can possibly be accomplished directly, without any special crank shaft. The pump 10 sucks the water through the suction conduit 20 with the suction basket 20a, and transports it to the pressure vessel 11, and therefrom the water is passed under pressure through the pressure conduit 13 to the turbo-generator 12.

Figures 13, 14:
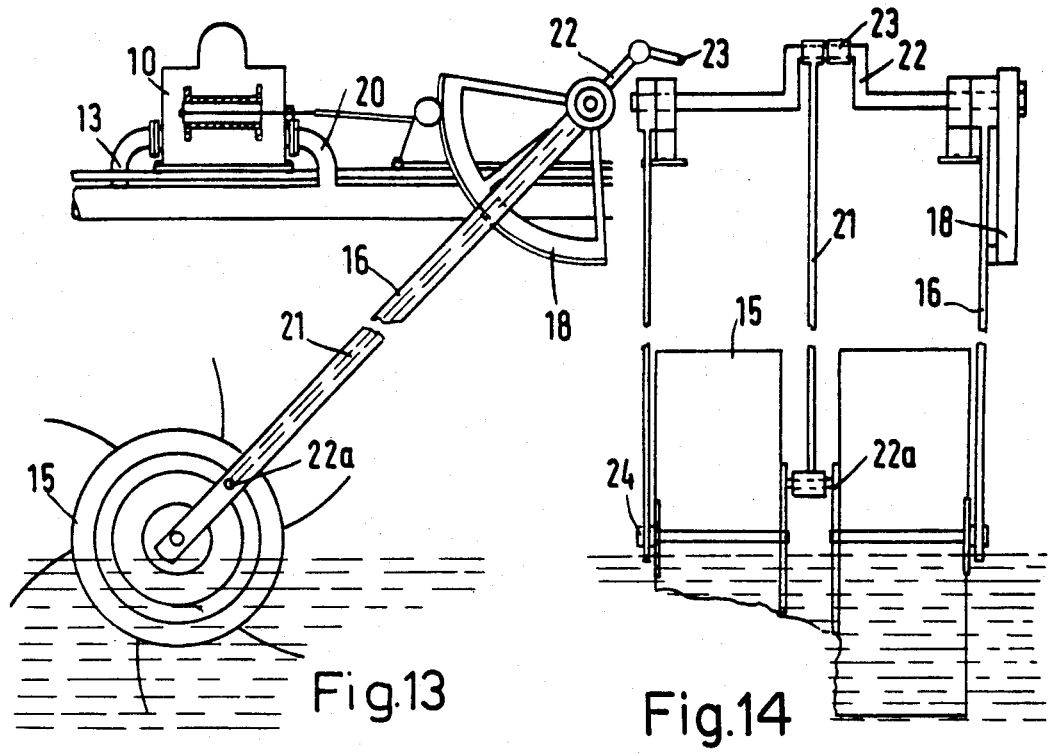
FIG. 13 is a lifting arrangement in elevation for utilizing the shoving force of the waves.
FIG. 14 is an elevation view of a pendulum float similar to FIG. 13.

FIG. 13 shows the arrangement for utilization of the lifting force and shoving force of the waves, the floats 15 being provided with shovels, so that the pivoting movement of the shovel float drives a second pump through a crank rod arrangement 21. Furthermore, the shovels expose a greater engaging surface to the shoving force of the water, so that the lifting force of the waves is considerably reinforced. The toothed segment 18 and the pendulum rods 16 are rigidly connected with one another, and are rotatably supported on a crank shaft 22. As can be ascertained from FIG. 13 in connection with FIG. 14, the floating axle 24 connected with the float 15 is pivotably supported in the pendulum rods 16. The crank rod 21, the crank shaft 22, the crank shaft pin 22a, and the drive rod 23 serve for the drive of the second piston pump 10.

Figure 15:
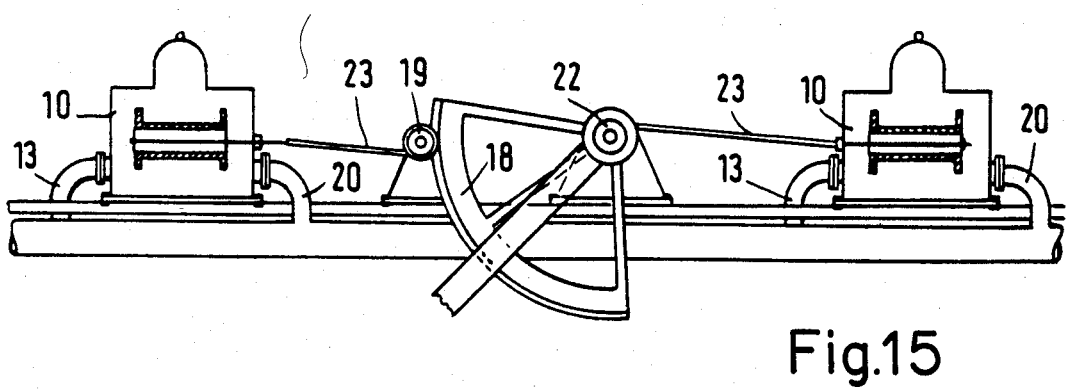
FIG. 15 is an elevation view of two piston pumps, which are driven by a pivotable pendulum swinger.

In FIG. 15 there is shown how two piston pumps are driven by a pivotable pendulum swinger. The drive is accomplished in the same manner through the drive rods 23 of the drive shaft 22.

In FIG. 16 there is provided a pendulum swinger with an outer-lying crank rod, and wherein the float 15 drives the second piston pump through the upper crank disk 26, and through the lower crank disk 26a through the drive rod 23. The shovels can be provided with a reinforcing ring 15a. The pendulum arms are denoted by 16.

FIG. 17 shows a side view of FIG. 16, where the arrangement of the float 15 with the pendulum arms 16, the toothed segment 18, the crank rod 21, the drive rod 23 to the piston pump, the upper crank disk 26, and the lower crank disk 26a, as well as the crank pin 27 are visible.

Figure 18:
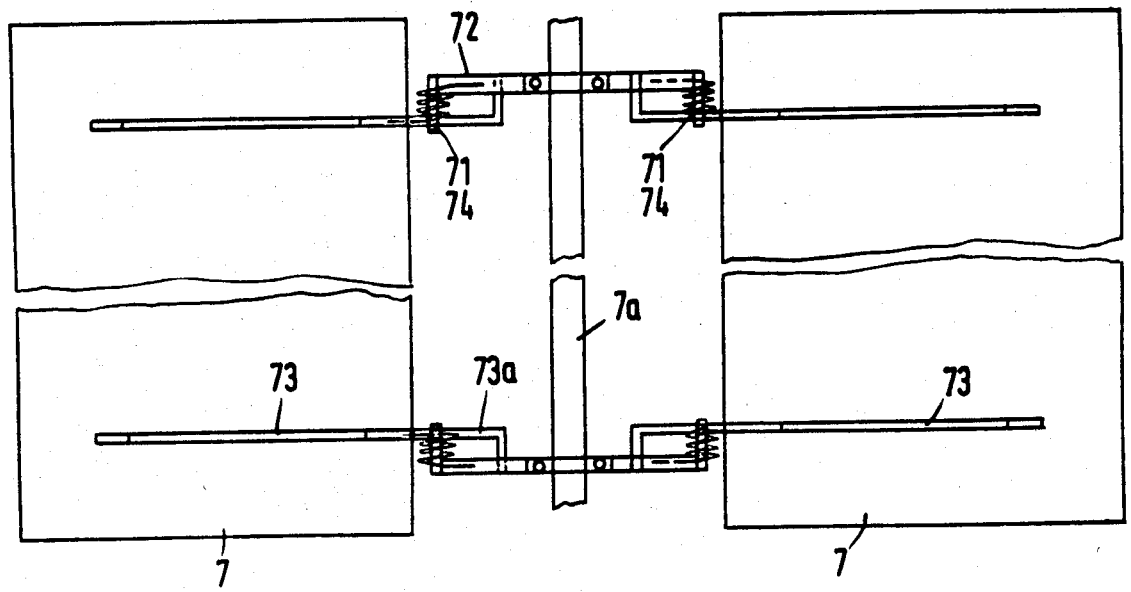
FIG. 18 is a side view, showing the suspension of the vertical blades with torsion springs.

In FIG. 18 there is described a secure suspension of the vertical blades with torsion springs. The blades 7 are disposed on the vertical axles 7a, wherein the axle 71 for the rotatable blades includes the bearing and the torsion springs. Support rails are denoted by 72, which are secured to the vertical axles, wherein reinforcing ribs 23 with suspension and extension form a positive stop 73a for adjustment and operative positioning. The gap 74 serves for passage of the wind to impact on the rear wings.

Figure 19:
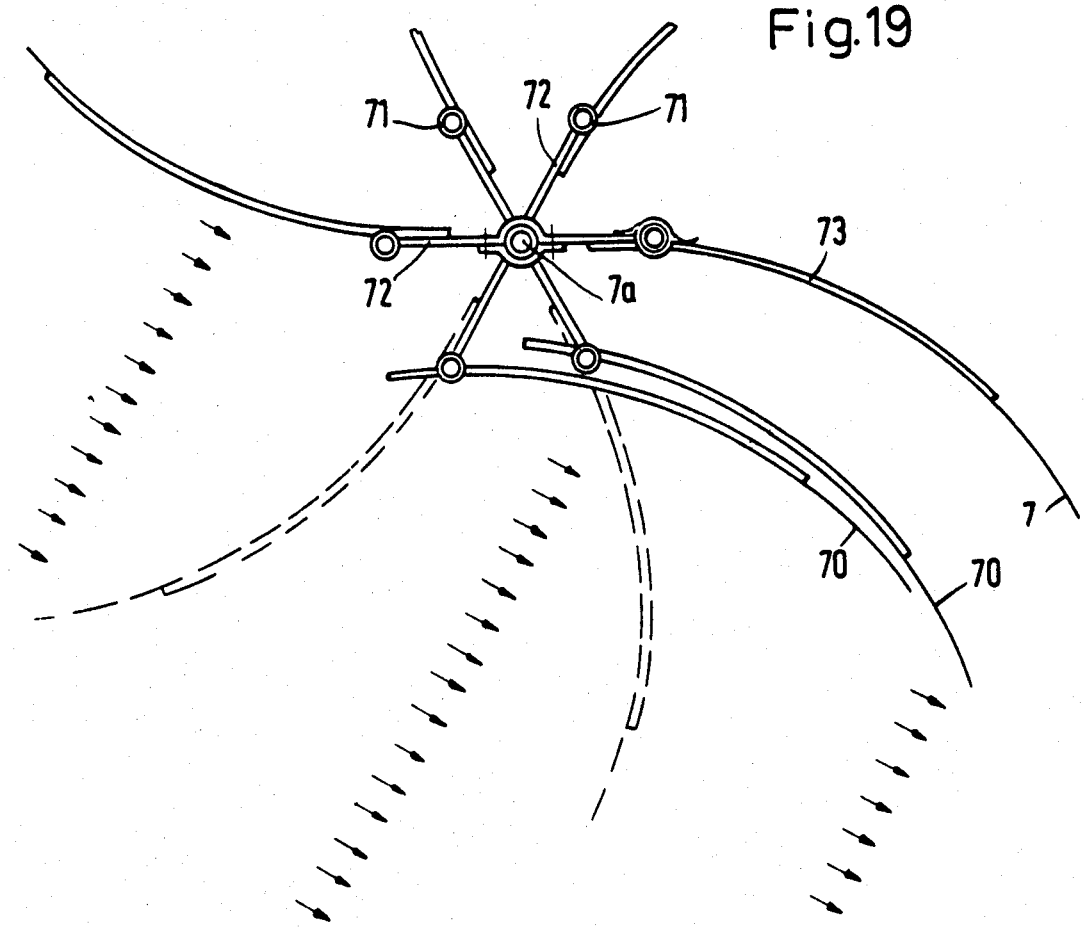
FIG. 19 is a rotatably supported blade affixation as in FIG. 18, seen from above.

From FIG. 19 there is visible the rotatably supported blade securement according to FIG. 18, seen from above. The blades 7 are in normal position, while the blades 70 are represented in a rearwardly swung secure position during a hurricane, or braked during a normal wind. The carrier rails 72 are secured to the vertical axles by means of tubular collars.

Figure 20:
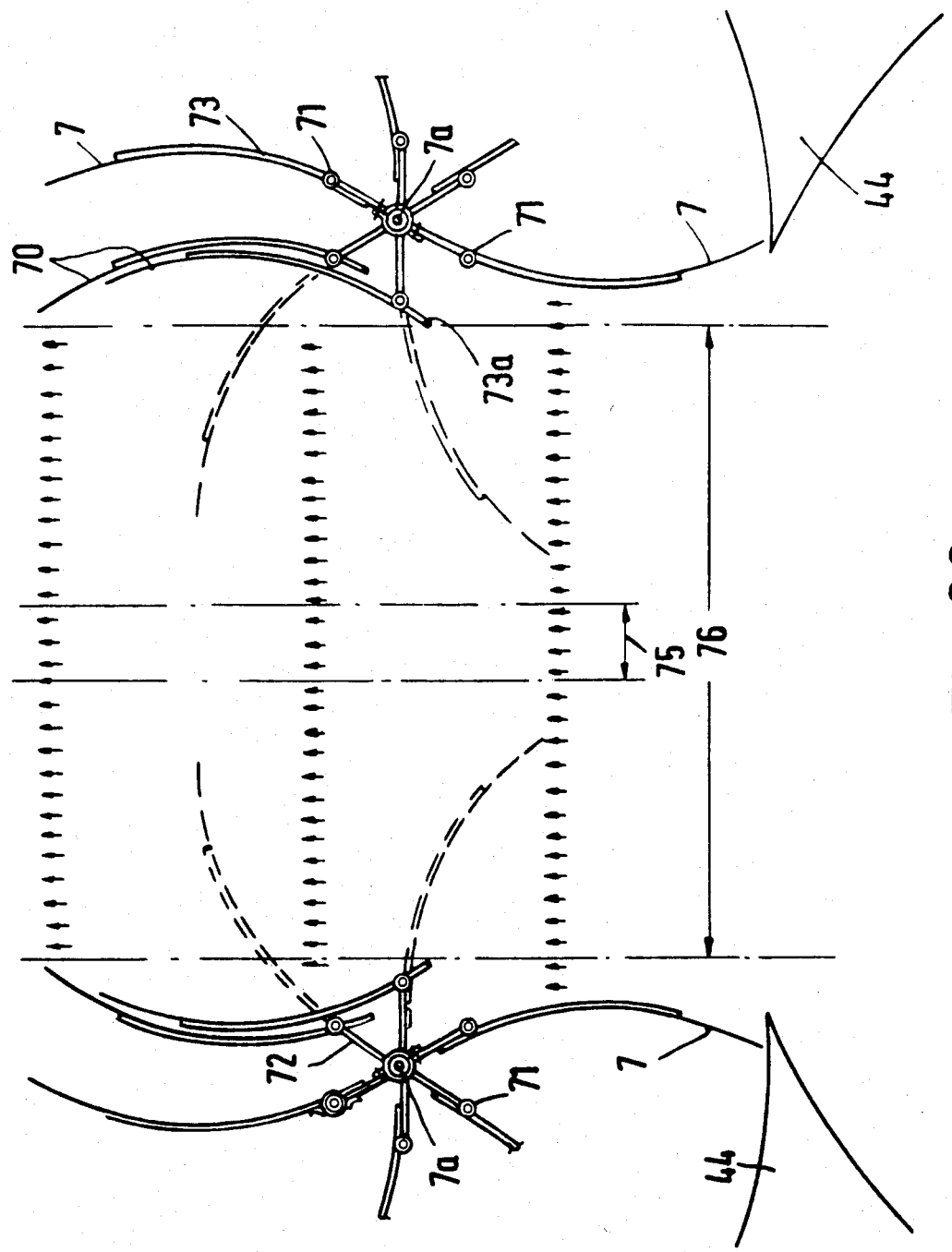
FIG. 20 is a plan view of an arrangement of the blades with an almost unhindred wind passage during a hurricane.

FIG. 20 shows the almost unhindered wind passage during a hurricane. The blades 70 yield rearwardly, so that the normal free wind passage 75 is broadened eightfold (See 76). The blades 7 are in normal position. Ahead of the blades there are disposed wind guidance surfaces 44, similar to those in FIG. 7. The positive stop 73a serves for normal operating positioning of the blades.

While only several embodiments of the present invention have been shown and described, it is obvious that many changes and modifications may be made thereunto without departing from the spirit and scope of the invention.

I claim:

1. A plant for the combined utilization of wind and wave energy in an ocean region, comprising:
   (a) a floating carrier for said plant;
   (b) a plurality of rotatable wind wheels driving respective axles;
   (c) a plurality of pendulum rods connected to floats disposed on the surface of the sea for movement up and down with the waves thereof, said up and down movement being with respect to said carrier;
   (d) a first plurality of pumps driven by the axles of said rotatable wind wheels through crank rods and crank shafts connected therebetween;
   (e) a second plurality of pumps driven by the up and down movement of said floats through toothed segments connected to said pendulum rods for rotational movement about a shaft mounted to said carrier and operatively connected to said pumps through gears and crank pins;
   said pumps, when driven by said wind wheels and said floats, being adapted to suction in water through suction conduits;
   (f) at least one pressure vessel for receiving said water from said pumps; and
   (g) a turbo generator driven by the water discharged by said at least one pressure vessel.

2. The plant as defined in claim 1, wherein said plurality of wind wheels have axles which are horizontally disposed, said wind wheels being arranged vertically and horizontally adjacent each other and the blades thereof being arranged so that adjacent wind wheels rotate in opposite directions, the axles of said vertically arranged wind wheels being operatively connected through a respective crank shaft and crank rods with said pumps.

3. The plant as defined in claim 1, wherein said wind wheels are disposed in a scaffolding with vertically extending tubular axles supported vertically in said scaffolding, said axles being provided with a crank shaft for driving said pumps at the lower end thereof.

4. The plant as defined in claim 3, wherein the wind wheels are formed with gaps between the axles and blades thereof for passage of wind so that the wind impacts upon the blades to the rear, and which further comprises star-shaped wind guide walls disposed between adjacent wind wheels to restrain the wind of the oppositely disposed blades of the wind wheels, and rear guide walls are provided to prevent interference between the air streams of the two oppositely running wind wheels.

5. The plant according to claim 4, wherein the vertical tubular axles in the region of the floor of each tier of the scaffolding comprise axle halves each having a recess with a wedge engageable with a recess in a connecting sleeve disposed between said axle halves, and a sleeve coupling each said axle with said connecting sleeve having a recess therein open at the lower end thereof so as to slide in through the wedge, and closed at the upper wedge end, and a support with a holding ring of the connecting sleeve and the sliding sleeve abutting the floor of the corresponding tier.

6. The plant according to claim 3, wherein a breaking ring is secured to a reinforcing rib of the wind wheels, said breaking ring cooperating with a magnetic break for stopping the turning movement of the wind wheels.

7. The plant as defined in claim 3, wherein each vertical axle is connected to a plurality of outwardly extending arms, the blades of said wind wheels being disposed in an upright position on said arms, said arms being pivotally connected to a suspension axle, the mounting including a torsional spring, and each of said arms including a stop means radially inwardly from said mounting, the axle of said mounting being disposed on a support rail extending from the vertical tubular axle of said wind wheel so that the blade is held in an operating position facing a wind direction whereby in the event of a storm acting on said blades along a certain direction, said blades yield rearwardly as viewed along said direction so as to expose a smaller operating surface to said storm, thereby protecting the pumps and also regulating the number of revolutions per unit of time of said pump.

8. The plant as defined in claim 1, wherein each said float is provided with a plurality of shovels so as to impart a rotating movement thereto, and including a second pump driven by the rotating movement of said float through a crank drive operatively connecting said second pump to said float.

9. The plant as defined in claim 8, wherein the pendulum rod is a pendulum swinger having a crank disposed to the exterior thereof connected to a crank mounted to the pendulum mounting, a crank rod interconnecting said cranks, and a drive rod operatively connecting the driven pump to the crank mounted to the mounting of said pendulum.

* * * * *